United States Patent [19]
Powell

[11] 3,843,805
[45] Oct. 22, 1974

[54] BASE COMPOSITION FOR PREPARING FOOD PRODUCTS
[75] Inventor: Louis A. Powell, Winter Haven, Fla.
[73] Assignee: Wellman-Power Gas Incorporated, Lakeland, Fla.
[22] Filed: Mar. 7, 1972
[21] Appl. No.: 232,628

Related U.S. Application Data
[63] Continuation-in-part of Ser. No. 145,066, May 19, 1971, abandoned, which is a continuation-in-part of Ser. No. 886,743, Dec. 19, 1969, abandoned, which is a continuation-in-part of Ser. No. 728,919, May 14, 1968, abandoned, which is a continuation-in-part of Ser. No. 401,254, Oct. 2, 1964, abandoned.

[52] U.S. Cl............ 426/92, 426/163, 426/185, 426/215, 426/332, 426/334, 426/356, 426/357
[51] Int. Cl.......... A23i 1/00, A23c 9/08, A23b 1/00
[58] Field of Search......... 99/54, 63, 139, 151, 150, 99/55, 157; 426/163, 185, 356, 364, 92, 332, 334, 357, 358, 213, 215

[56] References Cited
UNITED STATES PATENTS

| | | | |
|---|---|---|---|
| 2,440,517 | 4/1948 | Lesparte | 99/157 |
| 2,607,692 | 8/1952 | Kennedy et al. | 99/139 |
| 2,901,355 | 8/1959 | Bangert et al. | 99/139 |
| 2,959,485 | 11/1960 | Bell et al. | 99/55 |
| 3,224,883 | 12/1965 | Pader et al. | 99/139 |
| 3,332,785 | 7/1967 | Kuchinke et al. | 99/139 |
| 3,365,305 | 1/1968 | Hunter | 99/139 |

OTHER PUBLICATIONS
Ingram, et al., The Preservative Action of Acid Substances in Food, Chem. & Ind., (London), Oct. 27, 1956, (pp. 1154–1163) TPIS 63.

*Primary Examiner*—David M. Naff

[57] ABSTRACT

A dry admixture, which is useful either as a milk or meat preservative or as a base composition in preparing aqueous food products, contains pregelatinized starch, calcium acetate and sodium caseinate. Room temperature and freeze-thaw stable whips are attained when the admixture additionally contains fat or casein as a filler, the starch is gelatinized, the admixture is dispersed in water, and whipping of the aqueous mixture is initiated at temperatures which are preferably below 40°F. Raw starch may be substituted for the pregelatinized starch in preparing the stable whips by following procedures that include gelatinizing the raw starch followed by cooling and whipping from initially low temperatures within specified periods.

46 Claims, No Drawings

BASE COMPOSITION FOR PREPARING FOOD PRODUCTS

This application is a continuation-in-part of my copending application Ser. No. 145,066, filed May 19, 1971 (now abandoned), which latter application is a continuation-in-part of application Ser. No. 886,743, filed Dec. 19, 1969 (now abandoned), which latter application is a continuation-in-part of application Ser. No. 728,919, filed May 14, 1968, which latter application, now abandoned, is a continuation-in-part of application Ser. No. 401,254, filed Oct. 2, 1964, and now abandoned.

This invention relates to food products are to their preparation, and more particularly to base compositions used for preparing such food products as well as for preserving foods derived from animals and the like and to certain methods relating thereto.

A general object of the invention is to provide improved food products and methods for their preparation.

Another object is to provide methods for retarding the spoilage of foods such as milk and meats and which are derived from animals.

Yet another object is to provide a composition that can serve as a base for prepared food products and which is extremely versatile in use, being adapted for use in preparing foods wherein the principal flavor imparting component may be oily in nature, acidic in nature or alcoholic in nature.

Another object of the invention is to provide a base composition for prepared food products which imparts an illusion of richness to the consumers of the food products and which therefore is readily adapted for use as a base for low calorie prepared foods.

Still another object is to provide a composition that may be used as a base for prepared food products and which serves to accentuate the flavor of natural and synthetic food products.

A further object is to provide a composition that can serve as a base for prepared food products and which can be inexpensively packaged and marketed in a dry form without the need for the costly transportation of fluids that can otherwise be supplied by the consumer, but which nevertheless can also be marketed in aqueous mixtures either alone or with other food and with simple instructions for use that permits a wide latitude of deviation therefrom by the consumer.

Still another object is to provide a base composition for prepared food products which can be admixed with perishable foods to accentuate the taste and flavor of such foods and thereby to minimize the quantity needs of such perishable foods in the prepared products in order to acquire such tastes and flavors, which can be refrigerated and/or frozen along with such perishable foods without deterioration in quality.

Another object is to provide a base composition for use in preparing whipped food products and which is adaptable to the preparation of toppings and fills for desserts, ice creams, spreads, fruit and vegetable molds, as well as puddings and the like by the ordinary housewife through instructions that permit a wide latitude of deviation from the direction given.

Yet another object is to provide methods for securing whipped food products that remain stable at ambient temperatures for long periods in the sense that whips do not collapse, bleed or lose body as is customary with most whipped food products shortly after their preparation, the whipped products having the further characteristics of being capable of being repeatedly refrigerated and brought back to ambient temperatures and/or of being repeatedly frozen and thawed without adverse effects on such stability.

A further object is to provide a composition that can serve as a base for prepared food products which are heated, as by frying, baking or the like before use by the consumer and which serves to accentuate the flavor of foods subjected to the heat treatments.

Other objects of the invention will be apparent from the following description and disclosure.

This invention relates to a mixture of starch, calcium acetate, and sodium caseinate, that is useful as a milk or meat preservative or as a base composition for preparing stable whipped food products. For each 100 parts by weight of starch therein, the mixture contains about 3 to 300 parts of sodium caseinate and about 3 to 75 parts of calcium acetate. When used to prepare stable whipped products, the mixture generally contains the sodium caseinate in an amount of at least about 20 parts per each 100 parts by weight of the starch.

In accord with one process aspect of the invention, it has been discovered that when an aqueous system containing a pregelatinized starch, calcium acetate, sodium caseinate, and a suitable filler material such as vegetable fat or skimmed or whole milk solids, is whipped under certain conditions to provide a whipped food product, the resulting product is stable against bleeding and collapse at room temperature over long periods and can be repeatedly subjected to refrigeration and/or freezing and brought back to room temperature without adversely affecting the stability of the product. It has also been discovered that the calcium acetate, sodium caseinate and the gelatinized starch component cooperate in accentuating the flavor of foods and of flavoring substances added to the system and further provide to the consumer of the whipped products an illustory sensor of richness. This has given rise to further discoveries pertaining to ingredients and compositions used in the process of the invention, all of which is disclosed hereinafter.

The starch component must be hydrated or in a state of being readily hydratable at the time the ingredients are subjected to the whipping procedure. In the dry compositions hereinafter referred to, a pregelatinized starch is employed. However, it is within the purview of the process to start from raw starch, gelatinize it in water, and then use the aqueous suspension of hydrated starch as a component of the aqueous system subjected to the whipping step as will be seen hereinafter.

The starch may be derived from any suitable source such as corn, potatoes, wheat, tapioca, rice, sargo, and the like. In the preferred practice of the invention, a dry pregelatinized starch is employed. The pregelatinized starches are well known in the art as are the methods by which they are prepared. They may be prepared by simple heating procedures as is customary in the preparation of the so-called "cooked starches" to cause the cellular structure of the starch to rupture and thus to expose the starch for ready hydration by water. Commercially, the pregelatinized starches are prepared in most instances by suspending the raw starch in water and by then subjecting the aqueous system to heat and/or acidic conditions until the cellular structure of the starch is ruptured. The material is then dried as by spray drying techniques or on drum dryers as is well known. Yet another method is to subject dry raw starch to elevated temperatures in a moist atmosphere until the starch granules are ruptured. These pregelatinized starches are readily available on the market as simple pregelatinized starches and as modified pregelatinized starches and they are are characterized by their ready solubility or dispersibility in cold water to form a gel structure upon hydration and may be employed in the process of the invention disclosed herein.

In the preferred process of preparing the stable whipped food products of this invention, sodium caseinate, calcium acetate, and a dry pregelatinized (readily hydratable) starch are admixed in an aqueous system in proportions sufficient to provide a starch content sufficient to give a set whip, e.g., between about 5 and about 13 percent by weight (dry), based on the water content of the system; a sodium caseinate content of, generally, about 20, or even about 30, to about 300, preferably to about 200, percent, based on the weight of the starch; and a calcium acetate content of, generally, about 3 to 75, preferably to about 35, percent, also based on the weight of the starch. Inerts and other ingredients that may include natural and/or synthetic flavor imparting components can also be admixed in the system to the extent desired to provide the desired taste and in quantities sufficient to provide a total solids content which will give the desired whip consistency, usually at least about 25 percent and often up to about 50 percent or more, preferably between about 29 and about 50 percent, most preferably about 39–42 percent, said percentages being based on the total weight of the whipped product.

In practice, it has been ascertained that the pregelatinized starch component has a tendency to rapidly hydrate upon contact with the water and this makes it somewhat difficult in the absence of mechanical stirring apparatus to secure a smooth whipped product without laborious effort, for the starch thus has a tendency to initially occlude the other components. Hence, in practice, it is preferable to use a dispersant or hydration retardant that serves to retard the hydration of the starch until the soluble components have been suitably dispersed. In this respect, it has been found desirable to incorporate one or more of the sugars in the aqueous system when compounding the dry base compositions and preferably in amounts between about 20 and 30 percent by weight, based on the total solids content of the contemplated whipped product. One or more of such sugars as sucrose, glucose, fructose, mannose, lactose, and the like may be used in this respect, as well as sorbitol and some of the synthetic sweeteners such as "granulated" saccharin. Suitable sources of sugar include, for example, cane sugar, corn syrup, and corn syrup solids. Other types of dispersing agents may also be employed if desired and in special applications, e.g., in certain types of cheese cakes, such components as bread crumbs, cracker crumbs, dry pulverized cheeses and others have been employed for similar purposes.

Whipped products prepared by the process are characterized by their ability to retain their shape for long periods without collapsing or bleeding at room temperatures and may be repeatedly frozen or refrigerated and intermittently allowed to return to ambient temperatures without adversely affecting these characteristics. This permits the compositions of the invention hereinafter referred to to be employed in the preparation of fills and toppings that may be refrigerated and frozen.

Under frozen conditions the whipped products tend to be hard and difficult to cut, but it has been ascertained that the incorporation of a small amount of sodium monobasic phosphate tends to render the whips softer under such frozen conditions. The amount of sodium monobasic phosphate incorporated in the whipped product during its preparation is primarily limited by the amount that will produce an adverse phosphate taste, as will be readily detected by those skilled in the art, that usually being less than one per cent by weight, based on the total solids content, and best results have been secured when the phosphate is employed in the mixes in amounts between about 0.25 and 0.75 percent by weight, based on the total solids.

In general, it has been ascertained that the desired room temperature and freeze-thaw stability characteristics are not attained for long periods when the amount of starch and/or the amounts of calcium acetate and sodium caseinate fall below the lower limits specified above, and that the whipped products fail to satisfactorily peak in the manner characteristic of good whipped products. On the other hand, where the amounts thereof exceed the upper limits specified, the whip products are impossible to secure because the aqueous mixture becomes too thick to be suitably whipped.

Either the calcium acetate or the sodium caseinate may be used in a weight amount greater than the other. On the other hand, it is preferred practice when incorporating alcoholic ingredients or natural flavoring components of an acidic nature, such as fruit juices, e.g., citrus juices, in the whipped products of this invention in large amounts (as compared to the amounts that are customarily used when concentrated flavors such as extracts and the like are used) to use a weight ratio of sodium caseinate to calcium acetate (calculated as the monohydrate) exceeding 7.5. (As a point of information, it has been determined that approximately one part of calcium acetate monohydrate will react with approximately 7.5 parts of sodium caseinate in water to provide a precipitate having approximately 6 parts by weight (dry) of calcium salt of casein.) As seen from the examples provided hereinafter, the sodium caseinate may be used in amounts considerably in excess of the indicated ratio and in some instances as high or higher than 60 parts per part of calcium acetate. It is preferred to use no more than about 30 grams of the sodium caseinate per each 474 grams (about one pint) of the water however.

In preparing whipped products from the dry ingredients, the dry ingredients are preferably blended together to form a simple solid admixture of the ingredients in the desired proportions. This dry mixture is then dispersed in the desired amount of water or other aqueous base fluid by stirring. The aqueous dispersion is then whipped by stirring under conditions that entrap air or other suitable inert gas, e.g., nitrogen, in the aqueous system undergoing treatment and until the volume increases to the desired extent and the whipped product thickens or sets and maintains an increased volume as compared to the material before whipping. This can be accomplished, for example, by dispensing from an aerosol can.

Important in the preparation of whipped food products which will retain their whipped structure for substantial periods of time at room temperature, and be capable of being subjected to repeated freezing and thawing, is a need for initiating the whipped step when the aqueous system is at a temperature below about 45°F. and preferably below 40°F. The better results are secured when the whipping step is initiated with the aqueous system at a temperature approaching that of the freezing point of water.

In carrying the process into practice using conventional household stirring and mixing apparatus, one can add the requisite proportions of the selected dry ingredients to a mixture of crushed ice and water provided in amounts sufficient to provide the desired water content. The dry ingredients are then slowly stirred into the cold aqueous mixture until they are suitably dispersed in the system. Thereafter, the mixture is whipped at high speeds to entrap air in the mixture and for a period of time to permit the whip to thicken and take on a set after having reached its maximum volume under the whipping conditions. This set will be evident because a gradual decrease in the volume of the whipped product takes place with further whipping after the product has set.

Temperature recordings made during several tests of the whipping procedure under preferred conditions, using crushed ice and water at a system temperature of about 34°F. at the time the whipping step was initiated, indicated that the volume of the mixture usually starts to substantially increase when the temperature of the mix rises during the whipping procedure to within the range of about 36° to about 42°F., and thereafter tends to continue to increase as the temperature further rises until a maximum volume is reached at a temperature usually between 44° and 50°F. In most instances, it has been found that the whips set thereafter at a temperature between about 55° and 62°F. The setting of the whipped product will be evident to those skilled in the art because the whipped product tends to thicken at this point, requires more energy to stir, and thereafter tends to slowly lose volume if the whipping procedure is further continued.

One of the advantages of the process of this invention is that, unlike many whipped products, further whipping doesn't cause the whipped product of this invention to rapidly collapse. Instead, once the whipped product has set, further beating tends to cause the product to lose volume gradually so that the average housewife is unlikely to whip the mixture to the point that the desired product is destroyed, as is the case with other products marketed for similar purposes.

In the process of preparing the whipped product, the principal ingredients (e.g., the dry pregelatinized starch, calcium acetate and sodium caseinate) can be mixed together and blended into the aqueous system before the whipping step is initiated or, with difficulty, can individually or collectively be added to the system after initiation of the whipping step. They can also be mixed in the dry state with the fillers and other dry components that are used in the process and then blended into the aqueous system before the whipping step is initiated, or if desired, and again with some difficulty, increments of a dry blend of all of the ingredients may be added as the whipping process transpires.

The starch component of the base composition hydrates in the aqueous system and serves to form a basic gel structure in the whipped product, the structure being cellular in nature and containing air entrapped therein during the whipping process to which the system is subjected. The whipped product is rendered more viscous and is provided with more body when the starch content is increased in the practice of the process. Although not wishing to be bound by theory, it is believed that calcium salt of casein precipitates in the aqueous system and reinforces the starch gel structure. As more of both the calcium acetate and the sodium caseinate is used, more body is imparted to the whipped product as well as a greater tendency of the whipped product to form good peaks, as is desired by those familiar with food preparation procedures. Omission of either the calcium acetate or the sodium caseinate will prevent obtainment of a whipped product which is even reasonably comparable with that secured by following the above advocated process, and it should be mentioned that comparable results have not been secured by substituting a dry calcium salt of casein for the calcium acetate and sodium caseinate that are used in the process. Moreover, it is preferred that the solids used to form the aqueous mixture be essentially devoid of calcium caseinate as it has been found that the presence of that salt in substantial amounts can actually prevent the formation of stable whips.

The amount of fillers employed in the process to produce the desired solids content may also be varied to provide more or less body to the whipped product, less body being secured with the use of a lower total solids content in the aqueous system. Stable whipped products are obtained when the filler is fat, casein, or mixtures of fat and casein. Casein can be supplied, for example, in the form of whole or skimmed milk solids. For optimum stability, it is preferred to use fat, preferably saturated and preferably of vegetable origin. Most preferred are those fats melting in the range of about 50° to 140°F., most preferably about 80° to 110°F. Fat can be supplied, for example, in the form of whole or synthetic milk solids, the latter of which can also be the source of the sodium caseinate. The amount of filler will usually be about 0.5 to 3 or 4 parts, per part by weight of the starch. The examples given hereinafter, for instance, illustrate the preparation of whips containing anywhere from about 0.5 (Example XVIII) to about 1.9 (Example II) parts of casein (supplied as about 1.4 to 5.3 parts of skimmed milk solids) per part by weight of starch. (The casein content of skimmed milk solids is about 35 weight percent). The examples also illustrate the preparation of whips which contain fat in amounts from about 1.6 parts, per part of starch (Composition A, Table III) to about 3 parts, per part of starch (Compositions E, Table III). (Composition When fat is used as the filler material, it should be associated with an amount effective to emulsify the fat, e.g., a minor amount, preferably about 8 to 12 percent, based on the weight of the fat, of an edible emulsifier therefor in the preparation of the stable whipped products of this invention. Milk solids naturally contain such emulsifiers, but vegetable fats may have to be augmented in that respect in order to obtain stable whipped products. Suitable such emulsifiers, for example, are the fatty acid ester emulsifiers such as the partial fatty acid esters of polyhydric alcohols, including derivatives of such esters, e.g., those, such as the phosphatides, e.g., the lecithins, wherein remaining hydroxyl groups of the partial fatty acid esters are esterified with phosphoric acid, or its derivatives, and those wherein remaining hydroxyl groups of the partial fatty acid esters are etherified with polyoxyalkylene moieties, e.g., polyoxyethylene moieties. Suitable polyhydric alcohols for such esters include, for instance, glycols such as propylene glycol, glycerol, sorbitol, etc. Exemplary of these emulsifiers are the mono- and diglycerides of fatty acids of 12 to 18 carbon atoms.

Where hydratable components are employed, such as casein or some of the hydratable flavor imparting ingredients, such as the dried vegetables and fruits, minor adjustments in the amount of pregelatinized starch employed may be necessary within the ranges specified herein to compensate for the water absorbed by such components.

Among the flavor imparting components that may be used in the process to impart the desired taste and flavor may be mentioned the synthetic flavor concentrates and natural extracts that are available in dry and/or liquid concentrated forms such as vanilla, chocolate, orange, lemon, almond, walnut, butterscotch, lime, strawberry, peach, and raspberry, among others. Dehydrated natural fruit and vegetable powders and concentrates that may be used included those derived from citrus fruits, such as the orange, grapefruit, lemon, and limes, as well as those derived from such fruits and vegetables as bananas, raspberries, apples, strawberries, potatoes, onions, sweet potatoes, carrots and tomatoes. Dehydrated animal products may also be incorporated in the mixes of the process to impart flavor, such as dehydrated eggs and milk solids (whole or skimmed) as well as the dehydrated meat products such as the dehydrated fish, chicken, beef, lamb and other animal products. Other flavor imparting components that may be successfully used include the crushed fruits and vegetables and including their juices such as the orange, lemon and lime juices as well as the vegetable juices. Seasonings may be incorporated such as salt, pepper, garlic, spices annd herbs, as well as such prepared food components as mayonnaise, salad dressings, peanut butter, butter, catsup, chili sauce, etc. In addition, alcoholic beverages have been successfully used to impart flavor to the whipped products; typical of those being tried were bourbon, beer, wines, liqueurs and scotch.

In most cases, the flavor imparting components may be added to the system before the whipping step is initiated. In the case of the oil based flavor components, however, the best results are secured when these components are whipped into the system after the whip has set for such flavor components as peanut butter, mayonnaise and the salad dressings, have a tendency to occlude the dry materials and thus interfere with their dispersement and/or solubilization in the aqueous system.

The process lends itself to the ready use of both frozen citrus concentrates and whole citrus juices. For example, frozen concentrated orange juice (42° Brix) may be blended into a room temperature aqueous system containing the ingredients of the dry base composition in the selected proportions giving value for the water and solids content in the juice concentrate, and the low heat content of the frozen concentrate utilized for establishing the low temperature desired for securing whips in accord with the process disclosed heretofore. Thereafter, the system may be subjected to the whipping process to secure a whipped product as previously described. Under such circumstances, the orange flavor of the end product will be accentuated and the product will exhibit the room temperature and freeze-thaw stability heretofore mentioned.

It is apparent to those skilled in the art that the water content of the aqueous system utilized in the process may be, in part or wholly, supplied by the water content of such materials as whole and skimmed milks, fruits and vegetable juices, including the various citrus juices such as lemon, orange, tangerine, and other citrus juices to mention but a few.

One of the advantages of the process lies in the long time room temperature stability that is secured in the case of the whipped products prepared in accord with the process. This permits the process of the invention to be utilized in preparing heavy food whips that may be employed as spreads, as well as for lighter whipped products that can be used as dessert fills and toppings. For example, it has been found that commercial peanut butter, among other oil base products, may be blended into the whipped product to provide a spread having the richness in taste comparable to peanut butter but which nevertheless employs substantially lesser amounts of the more expensive peanut butter spread.

Whipped food products prepared in accordance with the aforementioned process have been prepared and retained at room temperatures for as much as 60 days without collapsing, and, in addition, have been repeatedly subjected to freeze-thaw tests in an attempt to break the structure of the whipped product without success.

If one desires to use raw starch in the preparation of the whipped products, the process heretofore disclosed may be modified to accommodate gelatinization of the starch. Under such circumstances, the solid components, including the raw starch, are dispersed in the water that is to enter into the make-up of the whipped product, and the resultant dispersion heated through the starch gelatinization temperature range to effect gelatinization of the starch. Most raw starches become gelatinized when heated in an aqueous system through the temperature range of from 147° to 162°F. The heating can be continued until the desired viscosity is obtained.

Following the starch cooking procedure, the aqueous, gelatinized starch-containing system is cooled and employed in preparing a whipped food product in accord with the process disclosed heretofore. Whipped products produced in this manner have been found to have all the characteristics of those produced from the dry pregelatinized starches including the much desired long time structure stability at room temperatures and under refrigerated or frozen conditions. Thus, one can gelatinize the raw starch by the above temperature treatment in the presence of the sodium caseinate and calcium acetate without adverse effect on the characteristics of the finished whipped products. Furthermore, this can be accomplished in the presence of the food flavoring components in many instances. As a result, it has been discovered that many of the perishable food products that normally require pasteurization before shipment may be pasteurized simultaneously with gelatinization of the raw starch.

In carrying out this latter procedure, the raw starch, sodium caseinate, calcium acetate, fresh perishable food, such as fresh citrus juice, and the filler components may be intimately blended together in the desired proportions and with the desired amount of water, if needed, and then heated through the temperature range for gelatinization of the starch and into the food pasteurization temperature range. This can be simply accomplished by heating the aqueous system to its boiling point and retaining it thereat for a few minutes (usually less than 5 minutes) and then cooling the heat treated system to a low temperature. Cooling may be accomplished rapidly, for example by flash cooling procedures, as in commercial practice, or as in household practice, by exposure to room temperature conditions, followed by cooling to the low temperature in a household food freezer. Once the temperature has been lowered to about the freezing point of water, as in the preferred situations, the aqueous mixture may be subjected to the whipping procedure heretofore advocated until the whipped product sets. Products prepared in this manner have been found to exhibit all the room temperature stability, freeze-thaw stability, richness and flavor accentuating characteristics evidenced by the whipped products prepared from the dry pregelatinized starches by the procedures previously given.

In general, it has been found that whipped products prepared by the processes disclosed above fail to exhibit the room temperature and freeze-thaw stability characteristics only when the principle ingredients (the starch, sodium caseinate and calcium acetate) have been combined in the aqueous system subjected to the whipping step for prolonged periods before whipping, and hence it is recommended that the whipping step be carried out within a period of about 48 hours after these ingredients have been mixed together with the aqueous component. This does not detract from the invention, however, for surprisingly it has been found that whipped products having all of the other characteristics may be secured by whipping aqueous mixes that have contained the principal ingredients for longer periods. The main difference in result is that the whipped products obtained from aqueous mixtures which have been allowed to stand for prolonged periods before whipping provide a lower volume increase. It is also preferred that the aqueous mixture be kept cool but unfrozen if it is not to be whipped immediately after its formation.

As will be illustrated in subsequent examples, one of the line of whipped products that can be made through use of the concepts of the invention is a counterpart to the common ice creams yet having the desired characteristic of being non-drip in nature. On the other hand, it has been discovered that the same compositions can be treated to produce a whipped product which has all the characteristics of ice creams, including that of dripping. This is accomplished by initiating the whipping step at higher temperatures than heretofore advocated and by simultaneously cooling the aqueous system during the whipping procedure to a temperature at which the whipped product is stable against collapse.

In accord with this latter aspect of the invention, the dry ingredients may be dispersed in room temperature water in the desired proportions heretofore mentioned, and subjected to the whipping step as the mixture is cooled to about the freezing point of water. Tests indicate that the volume increases about 100 percent during the whipping procedure that transpires in accord with this method as compared to a normal volume increase of from about 200 to 400 percent by the procedures previously disclosed for securing room temperature stable products.

Useful whipped products having lower solids and starch contents and also having smaller quantities of sodium caseinate and calcium acetate than previously disclosed herein may also be prepared by the procedures disclosed for preparing whips that are stable at room temperatures. Under such circumstances, however, the whipped products fail to exhibit the characteristics of the room temperature stable whips and are less viscous and more in the nature of the consistency of common milk shakes.

For example, fluid whipped products containing a total solids content as low as 20 percent, based on the total weight of the whipped product, have been prepared. In such cases, the dry starch contents have been as low as 0.4 percent, based on the water content of the system, and the amount of sodium caseinate employed has been as low as about 3 percent, based on the weight of starch employed.

From the foregoing, it is evident that a wide range of products may be prepared from compositions that contain a pregelatinized starch component in combination with sodium caseinate and calcium acetate. In addition to whipped products that can be prepared, compositions containing these components may also be used in the preparation of sauces and dressings as well as in the preparation of soups, gravys, cooked meat products, cakes and other products that are subjected to heating procedures during their preparation, as will be evident from the examples that follow. In each instance, it has been found that the composition tends to accentuate the flavor of the product.

Yet another aspect of the invention is the discovery that food products embodying the mixture of starch, calcium acetate, and sodium caseinate have a resistance to spoilage and tend to stay fresh and pure for longer periods than would be expected. For example, whips containing these ingredients have been found not to sour and are resistant to mold over long periods at room temperature even though containing milk products that would normally cause deterioration. This has given rise to the further discovery that the spoilage of animal products such as meat, poultry, and whole or skimmed milk may be retarded through use of compositions containing the starch, the calcium acetate and the sodium caseinate.

In treating cut meats for example, such as pork chops, lamb chops and the like, it has been found that if the meat product is coated with a thin coat of the admixture of starch, calcium acetate, and sodium caseinate, the meat will resist spoilage for several days longer than meat which is not coated with the mixture, even though the meat is left at room temperature and thus without refrigeration. In practice, meat products may be coated with a dry mixture of calcium acetate, a starch, and sodium caseinate in an amount sufficient to retard their spoilage, or they may be coated with a simple paste formed by admixing the mixture with a small amount of water.

Similarly, in treating fresh, pasteurized, whole, cow's milk, it has been found by dispersing a dry mixture of the ingredients in the milk, as by simple stirring procedures, that the milk will retain its freshness several days longer at room temperature, as well as under refrigeration, than normal, untreated, fresh milks. Tests indicated that none of the three ingredients alone will accomplish the same results. As a specific example, a mixture of 15 parts by weight of sodium caseinate, 1 part by weight of calcium acetate monohydrate, and 28.4 parts by weight of a dry, pregelatinized starch was stirred into a pint of fresh whole milk. It was still fresh after standing at room temperature for three days, whereas another pint of fresh whole milk soured during the same period at room temperature in about 24 hours. In general, it is contemplated that fresh milks may be similarly treated with compositions containing these ingredients in amounts sufficient to retard spoilage.

From the foregoing, it is evident that both dry and aqueous mixtures of the present invention may be prepared to serve as preservatives or base compositions in the preparation of food products. Especially contemplated is the use of solid, i.e., solid particle form, mixtures that contain, as essential components, calcium acetate, sodium caseinate, and a pregelatinized starch component.

Optionally, the mixtures of this invention may contain a starch dispersant such as a sugar and, in this respect, suitable mixtures may contain the sugar in a weight ratio of sugar to pregelatinized starch of from 0:1 to 50:1, or even greater. In most cases where the mixture is contemplated for use as base composition in preparing a stable, whipped food product, the starch is satisfactorily dispersed when the sugar is present in the mixture in a weight ratio of sugar to starch between 1:1 and 10:1. Dry mixtures of this nature may be packaged and marketed with simple instructions as to the other components (flavoring ingredients, etc.) that may be added to form the desired products, or may be marketed as simple admixtures of all ingredients that will enter into the desired product, except for the fluid.

In lieu of the dry mixtures, the principal ingredients of the mixture may also be combined in an aqueous system and marketed with simple instructions for use by the housewife, for example in preparing whips that require refrigeration. Products of this nature may have a water content which is sufficiently high enough to preclude the need for adding further water at the time the product is used or may have a water content considerably less than required at the time of use. Hence, in compositions of this type, the water content need be only sufficient to enable the ingredients to be dispersed therein. On the other hand, the water content may be large enough to provide a starch content in the water based mixture as low as 0.4 percent, based on the weight of the water.

The invention is further illustrated by the following examples.

EXAMPLE I

As a specific example of a dry base composition that may be packaged and marketed with simple instructions for its use in preparing whipped food products that are stable at room temperature and which may be repeatedly subjected to alternating freezing and thawing conditions, the following dry ingredients, in the proportions indicated, were stirred together in a mixing bowl to form a simple dry admixture thereof.

| | |
|---|---|
| Dry Synthetic Milk Solids[1] | 150 gm. |
| Cane Sugar | 68.1 gm. |
| Pregelatinized Corn Starch | 30.0 gm. |
| Calcium Acetate (Monohydrate) | 2.0 gm. |
| Cerelose (trademark for a brand of corn syrup solids) | 45.0 gm. |

[1]Commercially supplied under trademark "Richnin" and labeled as containing corn syrup solids, vegetable fat, sodium caseinate, dipotassium phosphate, emulsifier, tricalcium phosphate, artificial flavor, and artificial colors. Quantitative analysis indicates about 8 percent sodium caseinate content, about 35 percent vegetable fat content, and about 50 percent water soluble sugars content, said percentages being by weight of the total solids. Qualitative analysis shows fat to be saturated, to have a melting point of about 95°F., and to have characteristics of hydrogenated coconut oil and hydrogenated soybean oil. The artificial colors are reported by the manufacturer to be carotene and riboflavin.

The dry mixture was then stirred into 474 grams of an approximately 1:1 mixture of crushed ice and water, and subjected to the whipping action of a conventional household electric beater before any appreciable quantity of the ice had melted. As the whipping process transpired, a slight foam initially appeared and thereafter the volume of the mixture gradually increased as air became entrapped in the mixture and until a maximum volume of about 300 percent of the initial volume of the aqueous mixture was reached. The whipping process was continued until the whipped product thickened and set.

Samples of the whipped product were removed and exposed to room temperature conditions for a period of 1 month. At that time, it was ascertained that there was no collapse in the structure of the whipped product although there was a slight deterioration at the exterior surface of the product due to simple dehydration at the surface. The product was also edible at this point and showed no evidence of mold or other bacterial growth. Samples of the whipped product were also frozen in a conventional home freezer and repeatedly thawed and refrozen over a similar period without deterioration in the whip structure.

EXAMPLE II

As another example of the room temperature stability of whip prepared in accord with the process, the following ingredients were blended together to form a dry admixture thereof.

| | |
|---|---|
| Pregelatinized Corn Starch | 30 gm. |
| Dried Skim Milk Powder | 160 gm. |
| Cane Sugar | 65 gm. |
| Sodium Caseinate | 15 gm. |
| Calcium Acetate (Monohydrate) | 2 gm. |

This mixture was dumped into a bowl containing 474 grams of an approximately 1:1 mixture of crushed ice and water and the contents of the bowl immediately subjected to the whipping action of a conventional household electric beater. The beating process was continued until the whipped product set and the aqueous system reacted during the whipping process in the manner described in Example I.

The volume of the whipped product was approximately 350 percent greater than the initial volume of the bowl contents. This whipped product was left uncovered at room temperature for 2 months and retained its full volume characteristics even though the product became dehydrated somewhat because of the dry atmosphere in the storage area. The product also showed no evidence of having spoiled and was edible at the end of the 2 month period.

EXAMPLE III

As an example of a dry base composition that may be marketed with simple instructions for use in preparing a peanut butter of the like spread, a dry base composition was prepared by blending the following ingredients together:

| | |
|---|---|
| Dry Synthetic Milk Solids[1] | 150 gm. |
| Sodium Caseinate | 10 gm. |
| Calcium Acetate (Monohydrate) | 1 gm. |
| Pregelatinized Corn Starch | 28.4 gm. |

[1]See Example I

This composition was stirred into 474 grams of an approximately 1:1 mixture of crushed ice and water and thereafter the aqueous system was immediately subjected to the whipping action of a conventional household electric beater. The whipped product developed in the manner described in Example I and had a volume which was about 3 times the initial volume of the mixture subjected to the whipping step.

After the whipped product had set, the beating was discontinued and 8 ounces of commercially marketed homogenized peanut butter was added to the whipped product and the mixture whipped until the addition was thoroughly blended into the whipped product. The addition containing whipped product was then contained in a closed glass jar and showed no evidence of gel structure instability after retention at room temperature for better than a week.

The product was considered to have the full bodied taste and richness of normal peanut butter.

EXAMPLE IV

Another base composition that may be employed in preparing stable whipped products comprises an intimate dry admixture of the following ingredients:

| | |
|---|---|
| Dry Skim Milk Solids | 110 gm. |
| Sodium Caseinate | 15 gm. |
| Calcium Acetate (Monohydrate) | 2 gm. |
| Cerelose | 30 gm. |
| Cane Sugar | 30 gm. |
| Di-Potassium Phosphate | 0.5 gm. |
| Sodium Phosphate (Monobasic) | 1 gm. |
| Pregelatinized Starch | 28.4 gm. |

A whipped product was prepared from this base composition by dispersing the composition in 474 grams of 1:1 mixture of crushed ice and water. Immediately thereafter, the aqueous dispersion was subjected to the whipping action of a conventional household electric beater and whipped until the whipped product thickened and set. At this point, the beating process was discontinued and a 5½ ounce can of commercial frozen concentrated apple juice was then added to the whipped product. The whipping process was again initiated to blend the frozen concentrate into the whipped product and as soon as this objective was attained, the whipping process was discontinued.

The product was used as a pie fill and upon filling the pie crust with the whipper product, the pie was frozen in a household deep freeze. Thereafter, and in the course of 2 days, the pie was removed from the freezer, permitted to thaw out, and returned to the freezer seven separate times with no evidence of an adverse affect on the structure of the whipped product.

In addition, it was found that the pie had excellent taste, flavor and richness qualities. Surprisingly, the apple appeared to be accentuated to a greated extent when the pie was tasted at lower temperatures than at room temperatures.

EXAMPLE V

Another dry base composition comprises an intimate dry admixture of the following ingredients:

| | |
|---|---|
| Dry Synthetic Milk Solids[1] | 150 gm. |
| Pregelatinized Starch | 28.4 gm. |
| Calcium Acetate (Monohydrate) | 1.5 gm. |
| Sodium Phosphate (Monobasic) | 1.5 gm. |
| Cerelose | 40 gm. |
| Fine Cane Sugar | 70 gm. |
| NaCl | 1.5 gm. |

[1]See Example I

This base composition was dispersed in 474 grams of an approximately 1:1 mixture of crushed ice and water, and immediately subjected to the whipping action of a conventional household electric mixer and continuously whipped until the whipped product set. At this point, the whipping process was discontinued and 4 ounces of frozen concentrated orange juice was added to the whipped product and then whipped into the product until a smooth whip was secured. The resulting whip was then used as a pie fill.

Four pies for test purposes were prepared using this identical procedure. One pie was left at room temperature for three days without the whipped product showing evidence of room temperature instability and thereafter stored under freezing conditions for six months. At the end of this period, the pie was still found to have a stable structure at room temperature and had excellent taste and flavor qualities.

Another of the pies was refrigerated at about 40°F. for a period of 10 days with no evidence of instability or deterioration except for minor dehydration at the surface of the whipped product. It too had excellent taste and flavor qualities.

As for the other two pies tested, one was frozen and wrapped in aluminum foil and then continuously stored in a home food freezer for 6 months. The other pie was also frozen but without wrapping, and over a 6 month period of storage in the same freezer was removed from the freezer approximately every 7 days for a period of 2 hours. Both of the pies exhibited excellent stability against collapse, etc., throughout the period and had excellent flavor and taste qualities at the end of the testing period.

EXAMPLE VI

Another composition which may also be marketed with simple instructions for its use in preparing whipped food products comprises a dry mixture of the following:

| | |
|---|---|
| Dry Synthetic Milk Solids[1] | 131 gm. |
| Raw Corn Starch | 28.4 gm. |
| Sodium Caseinate | 15 gm. |
| Calcium Acetate (Monohydrate) | 1 gm. |
| Sodium Phosphate (Monobasic) | 1 gm. |
| Cerelose | 40 gm. |
| Fine Cane Sugar | 60 gm. |
| NaCl | 1 gm. |

[1]See Example I

A whipped product was prepared from this composition by first adding the composition with stirring to 474 grams of boiling water. Boiling and stirring the contents of the aqueous system was continued for about 4 minutes and thereafter the beating was discontinued. The aqueous mixture was then placed in a home freezer maintained at about −10°F. and permitted to cool to a temperature (about 29°F.) at which ice crystals were forming in the mixture. The mixture was then removed from the freezer and immediately subjected to the whipping action of a conventional household electric beater until the mix whipped and took on a set. The mixture increased about 300 percent in volume during the whipping process.

Four ounces for normal orange juice concentrate (42°Brix) may be added to the whipped product and the product again whipped to disperse the concentrate throughout the gel structure of the whip. The resulting product will be found to have excellent room temperature stability as well as good taste and flavor.

EXAMPLE VII

The base composition shown in Example VI was blended into 474 grams of room temperature water together with 4 ounces of commercial orange juice concentrate (42° Brix) and the aqueous mixture heated to its boiling point on a stove. The mixture was stirred throughout the heating process of about 10 minutes. It was then removed from the stove and placed in a home freezer maintained at a temperature of about −10°F. and maintained therein until crystals of ice started to form in the aqueous mixture. The mixture was then removed and whipped with a conventional household beater until the whipped product set. The whipped product had good room temperature stability characteristics and an excellent flavor and taste.

EXAMPLE VIII

Another embodiment of the invention comprises a composition comprising the following ingredients in the proportions indicated:

| | |
|---|---|
| Sodium Caseinate | 15 gm. |
| Calcium Acetate (Monohydrate) | 1 gm. |
| Pregelatinized Starch | 28.4 gm. |
| Dried Skim Milk Solids | 80 gm. |
| Dried Pulverized Onions | 5 gm. |
| NaCl | 1 gm. |
| Sodium Phosphate (Monobasic) | 1 gm. |
| White Pepper (ground) | 0.1 gm. |
| Monosodium Glutamate | 1 gm. |

This composition was added with simple stirring to 474 grams of boiling water and thereafter continuously stirred until the mixture thickened. The resulting product was a low calorie cream of onion soup and it was found to have excellent flavor and taste characteristics.

EXAMPLE IX

A composition which serves as an excellent dry base for low calorie milk shakes comprises the following ingredients in the indicated proportions:

| | |
|---|---|
| Dry Skim Milk Solids | 120 parts |
| Pregelatinized Starch | 28.4 parts |
| Calcium Acetate (Monohydrate) | 0.5 parts |
| Sodium Caseinate | 10 parts |
| Sodium Phosphate (Monobasic) | 1.5 parts |
| Cerelose | 30 parts |
| Fine Cane Sugar | 50 parts |
| NaCl | 1 part |

Four heaping tablespoonfuls of the above composition (approximately 50 grams) may be added to 8 ounces of an approximated mixture of crushed ice and water in a Waring blender together with a few drops of vanilla extract. The ingredients of the mixture can then be whipped in the blender for from 3 to 5 minutes and will roughly compare in consistency, taste and appearance to a normal milk shake prepared from one half pint of whole milk and 2 scoops of ice milk.

The volume of the mixture increases during the whipping process about 100 percent and, like ordinary milk shakes, has a whipped structure that collapses at room temperature in a matter of 30 – 60 minutes.

Fresh fruits may be added to the mixture if desired.

EXAMPLE X

A dry admixture of the ingredients below has served as a base composition in the preparation of an ice cream substitute that has a stable whipped structure at room temperature and thus may be employed for preparing a non-drip ice cream substitute:

| | |
|---|---|
| Dry Synthetic Milk Solids[1] | 140 gm. |
| Pregelatinized Starch | 30 gm. |
| Calcium Acetate (Monohydrate) | 1.5 gm. |
| Sodium Phosphate (Monobasic) | 1.5 gm. |
| Cerelose | 40 gm. |
| Fine Cane Sugar | 65 gm. |
| NaCl | 1.5 gm. |

[1] See Example I.

The base composition was mixed with 30 grams of cocoa (Hershey) and sifted.

The sifted product was then dispersed in 474 grams of an approximately 1:1 mixture of crushed ice and water by simple stirring procedures. Immediately thereafter, the aqueous mixture was subjected to the whipping action of a normal household electric beater and whipped until the whipped product set. The whipped product was then put into ice cream cones where it exhibited excellent peaking properties and had an excellent flavor and taste. The whipped product was found to retain its structural characteristics under room temperature conditions and exhibited excellent freeze-thaw characteristics.

EXAMPLE XI

An ice cream substitute which has all the characteristic dripping properties of normal ice cream can also be made from the base composition of Example X.

This has been accomplished by mixing the base composition in the proportions indicated with 30 parts of cocoa (Hershey) as in Example X, sifting the mixture and then dispersing the sifted product in 474 grams of water at room temperature.

This aqueous dispersion was then poured into a commercial soft freeze ice cream mixer and beat in a cooling chamber thereof for about 15 minutes as the temperature of the mixture was brought down to approximately 32°F. The product increased in volume by about 2 times its initial volume as it was being treated, whereas in the prior example the volume increased about 300 percent.

The whipped product had an excellent taste and was stable under frozen conditions but lacked the room temperature structural stability of the product formed in accord with the process of the prior example. Instead, it tended to melt upon exposure to air in the manner of normal ice cream.

EXAMPLE XII

The base composition shown in Example X may also be treated in yet a different manner to provide an ice cream substitute. For example, the base composition set forth in Example X was blended with 30 grams of cocoa (Hershey) and with 8.35 ounces of room temperature water by simple stirring procedures. The aqueous system was then canned in the conventional and so-called "tin can". The canned product was then immediately frozen and retained for three months at about −10°F. At the end of the period, the contents of the can, and while the product remained frozen, were placed in a mixing bowl with 8.35 ounces of water and blended therein by simple stirring to secure an aqueous blend having a temperature of about 32°F. At this point, the contents of the bowl were whipped with a conventional electric household beater. It was found that the product increased in volume about 200 percent but failed to set, as is customary when the initial ingredients are whipped in the aqueous system without prolonged storage therein. The whipped product, however, had all the characteristics of normal ice creams and melted upon approaching room temperatures. It had excellent taste and flavor, and prolonged storage appeared in no way to detract from the illusion of richness characteristics imparted to the food products by the principal components of the compositions.

EXAMPLE XIII

Yet another example of a base composition that may be used in preparing soups comprises a simple mixture of the following in the proportions indicated:

| | |
|---|---|
| Sodium Caseinate | 15 gm. |
| Calcium Acetate | 1.0 gm. |
| Pregelatinized Starch | 28.4 gm. |
| Dried Skim Milk Solids | 80.0 gm. |
| Dried Onions | 5.0 gm. |
| NaCl | 1.0 gm. |
| Sodium Phosphate (Monobasic) | 1.0 gm. |
| Black Pepper | 0.2 gm. |
| Dried Potatoes | 56.8 gm. |

The soup may be prepared by a housewife by simply adding the base composition to 474 grams of boiling water and stirring the aqueous mixture until the system thickens. Alternately, the composition may be added to the same amount of water and then brought to the boiling point with continuous stirring until the mixture thickens.

Soups prepared in accord with the procedure of this example have been found to have an apparent richness that can only be attributed to the principal components of the base composition described herein and additionally have been found to have flavors that are accentuated.

EXAMPLE XIV

Another example illustrating the use of the base composition in preparing food products comprises the use of a composition comprising the following ingredients in the indicated proportions:

| | |
|---|---|
| Sodium Caseinate | 15 gm. |
| Calcium Acetate (Monohydrate) | 1 gm. |
| Pregelatinized Starch | 28.4 gm. |

A simple admixture of the above ingredients may be marketed for use in making sauces and gravys.

A chicken gravy may be prepared by simply mixing the base composition with 16.7 ounces of conventional chicken stock used by chefs and cooks and by bringing the mixture to its boiling point. The aqueous system is stirred as the ingredients are brought to the boil and then whipped with a wire whisk until the desired thickness is attained.

The base composition may also be used for preparing such sauces as orange sauces, raisin sauces, cream sauces, cheese sauces and Newburg sauces.

EXAMPLE XV

A simple mixture of the following ingredients may be marketed as a dry product for use in preparing so-called "ice box puddings" with simple instructions for their preparation.

| | |
|---|---|
| Sodium Caseinate | 10 gm. |
| Calcium Acetate (Monohydrate) | 1 gm. |
| Pregelatinized Starch | 28.4 gm. |
| Dry Skim Milk Solids | 40 gm. |
| Cerelose | 35 gm. |
| Cane Sugar | 35 gm. |
| Sodium Phosphate (Monobasic) | 1 gm. |

A vanilla pudding may be prepared from the above composition by blending the composition into 16.7 ounces of cold water at a temperature of about 40°F. and by thereafter whipping the contents of the aqueous system for about 4 or 5 minutes. The product may be flavored by adding 4 drops of pure vanilla to the system during the whipping process. After the ingredients have been thoroughly whipped together, the contents may be placed in a refrigerator and allowed to set.

Puddings made in accord with the illustrated embodiment in this instance have been found, after 2 weeks storage under normal refrigeration, to have the taste, appearance, and flavor of freshly made puddings. Furthermore, it has been found that puddings prepared in accord with this embodiment, when frozen for as long as 3 months and thereafter removed from the freezer and kept under normal refrigeration, will have the appearance, taste and flavor of having been freshly prepared.

EXAMPLE XVI

A cream style dressing may be prepared from the following bland base composition:

| | |
|---|---|
| Sodium Caseinate | 20 gm. |
| Calcium Acetate (Monohydrate) | 1.5 gm. |
| Pregelatinized Starch | 30 gm. |
| Sodium Phosphate (Monobasic) | 1.5 gm. |
| Cane Sugar | 20 gm. |
| NaCl | 2 gm. |

The dressing may be prepared by first dispersing the base composition in 16.7 ounces of an approximately 1:1 mixture of crushed ice and water contained in a mixing bowl by simple stirring procedures. The contents of the bowl are then whipped at high speed for a period of about 8 minutes. There is then added to the whipped product 10 grams of sweet pickle juice and 120 grams of catsup, and the mixture is further whipped to blend in the added ingredients.

Dressings prepared substantially in accord with this procedure have been found to give an apparent richness, texture, taste and appearance of dressings made with oil, eggs or mayonnaise.

EXAMPLE XVII

As yet another embodiment of the invention, and which illustrates the ability of the bland base components to withstand heating procedures without detracting from their ability to enhance the flavor, richness and taste of the product, a bland base composition consisting of 15 grams of sodium caseinate, 1 gram of calcium acetate (monohydrate), and 28.4 grams of pregelatinized potato starch may be dry blended with the following ingredients:

| | |
|---|---|
| Sodium Phosphate (Monobasic) | 1.5 gm. |
| Dried Cheddar Cheese | 56.8 gm. |
| Dried Skim Milk Solids | 40 gm. |

The dry admixture of the base composition with the above ingredients is then blended into 16.7 ounces of an approximately 1:1 mixture of crushed ice and water. The components are then whipped in the aqueous system with a conventional household food mixer until the volume increases to its maximum extent. The whipping in this case, however, is stopped before the whipped product thickens and takes on a set and enough flour is folded into the whipped product to make a dough a little stiffer than normal pie dough. This dough is then rolled out on a floured board, cut into strips and fried in deep fat until crisp. The fried product may then be taken from the fryer, drained of its oil and tumbled in dry cheddar cheese. The product will be found to have an enhanced flavor and which is not derived through omission of any one or more of the ingredients of the base bland composition.

EXAMPLE XVIII

An excellent meat loaf which may be prepared from yet another bland base composition that may be marketed with simple instructions for use comprises a simple mixture of the following ingredients:

| | |
|---|---|
| Sodium Caseinate | 20 gm. |
| Calcium Acetate (Monohydrate) | 2 gm. |
| Pregelatinized Corn Starch | 28.4 gm. |
| Dry Skim Milk Solids | 40 gm. |

The meat loaf may be prepared from this base composition by first blending the base composition together with 6 ounces of fine bread crumbs in 16.7 ounces of an approximately 1:1 mixture of crushed ice and water by simple mixing procedures in a mixing bowl. Thereafter, the contents of the bowl are whipped at high speed for about 8 minutes and until the maximum volume increase has been secured through the mixing action, the whipping action being discontinued, however, before the whipped product sets.

Four pounds of ground beef are then folded into the whipped product and the mixture placed in a suitable molding vessel. The contents are then preferably placed in a refrigerator for about 1 hour and thereafter baked at 350°F. for 1 hour, or longer if desired.

It has been found that meat loaves prepared in accord with this procedure are not only characterized by enhanced flavor and taste, but have better keeping qualities under refrigeration. For example, common meat loaf preparations normally spoil in a matter of about 4 days when kept under refrigeration at about 40°F. On the other hand, the meat loaf preparation in accord with this procedure was found to be entirely suitable for baking after having been refrigerated at about 40°F. over a period extending beyond 1 week.

EXAMPLE XIX

To illustrate the flavor enhancing characteristics of a composition embodying the concepts of the invention, 2 tests were run in which 16.7 ounces of fresh orange juice was heated to its boiling point under atmospheric pressure conditions and the following ingredients added thereto and the system continuously stirred for about 3 minutes to effect gelatinization of the starch.

| | |
|---|---|
| Synthetic Dry Milk Solids[1] | 150 gm. |
| Calcium Acetate (Monohydrate) | 2 gm. |
| Sodium Phosphate (Monobasic) | 1 gm. |
| Raw Corn Starch | 28.4 gm. |
| Cane Sugar | 30.0 gm. |

[1] See Example I.

In one test, the heat treated mixture was transferred to a bowl and placed in a home deep freeze maintained at about −10°F. until ice crystals appeared in the mixture. Thereafter, the contents of the bowl were immediately whipped until the whipped product increased in volume and took on a set. The product was found to be stable in structure at room temperature, would withstand freeze-thaw testing, and had a volume increase of about 250 percent.

In the other test, the heat treated mixture was transferred to a bowl and permitted to cool to room temperature without refrigeration. The product under these conditions had the structure of a common pudding and would not whip into a whipped product when subjected to the beating action of a household mixer at room temperature. To further test the product, however, it was then refrigerated to a temperature of about 32°F. and again subjected to the whipping action of a household beater under these temperature conditions. Under such circumstances, the product was found to be whippable and increased in volume about 100 percent before it thickened and took on a set. The resulting whip was then found to be stable against collapse, etc., at room temperature and also capable of withstanding freeze-thaw tests.

In each instance of the whips tested, the whips had the full bodied flavor and taste of fresh orange juice which is surprising for it is readily recognized that when orange juice is boiled at 212°F., its taste is adversely affected and it loses its fresh taste.

EXAMPLE XX

Substantially identical results were obained when tests like those spelled out in Example XIX were performed with the exception that the ingredients were added to the fresh orange juice at room temperature and before it was brought to the boiling point.

EXAMPLE XXI

Substantially identical results were obtained when tests like those spelled out in Example XIX were performed using fresh tomato juice in place of the fresh orange juice.

EXAMPLE XXII

Substantially identical results were obtained when tests like those spelled out in Example XIX were performed using crushed red raspberries in place of the fresh orange juice.

EXAMPLE XXIII

Substantially identical results were obtained when tests like those spelled out in Example XIX were performed and the following composition was added to the fresh orange juice instead of that mentioned in Example XIX:

| | |
|---|---|
| Dry Skim Milk | 100 gm. |
| Sodium Caseinate | 20 gm. |
| Calcium Acetate (Monohydrate) | 2 gm. |
| Cerelose | 35 gm. |
| Cane Sugar | 45 gm. |
| Raw Corn Starch | 20 gm. |
| Sodium Phosphate | 1 gm. |

EXAMPLE XXIV

The data contained in Table I serves to illustrate the preservative properties of the mixture of ingredients involved in the base composition and to also contrast such properties with those of the respective ingredients when the mixture and the respective ingredients are employed as additives to fresh milk to retard its spoilage.

It each test, the additive was stirred into a pint of fresh, pasteurized, whole, cow's milk in the amount indicated in the table and the additive containing milk was then stored at either room temperature (about 80°F.) or under refrigerated conditions (about 40°F.) as indicated in the table. Samples were removed from the stored containers at approximately 24 hour intervals during the testing procedure and subjected to taste tests to ascertain the quality of the stored product. The shelf life is indicative of the time required for the stored test samples to turn sour and it is readily apparent from the data contained therein that the mixture of ingredients involved in the base composition materially prolongs storage life of the milk under both room temperature and refrigerated storage conditions.

| | Weight Percent |
|---|---|
| Sodium Caseinate | 33.75 |
| Calcium Acetate | 2.25 |
| Pregelatinized Starch | 64.0 |

EXAMPLE XXV

To show the plasticizing effect of sodium monobasic phosphate on frozen whipped products prepared in accord with the invention, a series of tests were conducted wherein sodium monobasic phosphate was employed in each test as an additive to a dry mixture of the following ingredients:

| Ingredients | Weight (Grams) |
|---|---|
| Dry synthetic milk solids[1] | 150 |
| Cane Sugar | 68.1 |
| Pregelatinized Tapioca Starch | 30.0 |
| Calcium Acetate (Monohydrate) | 2.0 |
| Cerelose | 45.0 |
| Total Weight | 295.1 |

[1] See Example I

The results of each test are shown in Table II below and in each instance, the amount of sodium monobasic phosphate used in the tests was initially mixed with the above ingredients and in the amounts indicated. The mixture was then stirred into 494 grams of an approximate 1:1 mixture of ice and water and then whipped for about 4 minutes with a conventional restaurant type beater. In each instance, the overrun was approximately 200 percent. The whipped product was then placed in an aluminum foil pan and stored in a freezer (about 0°F.) for a period of 24 hours to provide a 2 inch thick frozen block of the whipped product for each test. Following the freezing period, the pan was stripped from the frozen block-like product and the resistance of cutting was immediately measured by ascertaining the amount of weight needed to induce an 18 gauge flexible steel wire to cut through the frozen product in an approximate period of 1 minute. The test results shown in Table II clearly show that the amount of weight needed to cut the frozen whipped product progressively diminishes as the amount of phosphate salt incorporated in the mixture is increased.

TABLE 1

| Test No. | Additive | Gms./Pint | Storage Conditions | Storage Life |
|---|---|---|---|---|
| 1 | Control | None | Room Temperature | 2 days |
| 3 | Base Comp.[2] | 44.4 | Room Temperature | 4 days |
| 6 | Base Comp.[2] | 2.78 | Room Temperature | 4 days |
| 7 | Base Comp.[2] | 1.39 | Room Temperature | 4 days |
| 23 | Sodium Caseinate | 15.0 | Room Temperature | 2 days |
| 25 | Pregelatinized Starch | 28.4 | Room Temperature | 2 days |
| 24 | Calcium Acetate | 1.0 | Room Temperature | 2 days |
| 2 | Control | None | Refrigerated | 5 days |
| 8 | Base Comp.[2] | 44.4 | Refrigerated | 33 days |
| 11 | Base Comp.[2] | 2.78 | Refrigerated | 20 days |
| 12 | Base Comp.[2] | 1.39 | Refrigerated | 18 days |
| 32 | Sodium Caseinate | 15.0 | Refrigerated | 5 days |
| 34 | Pregelatinized Starch | 28.4 | Refrigerated | 5 days |
| 33 | Calcium Acetate | 1.0 | Refrigerated | 5 days |

[2] The Base Composition was an intimate mixture of the following ingredients:

TABLE II

| Test No. | Additive | Grams | Cutting Weight |
|---|---|---|---|
| 1 | None | Control | 1 lb. 8 oz. |
| 2 | Sodium Phosphate | 0.295 | 1 lb. 6 oz. |
| 3 | Sodium Phosphate | 0.59 | 1 lb. 3 oz. |
| 4 | Sodium Phosphate | 0.88 | 1 lb. 1 oz. |
| 5 | Sodium Phosphate | 1.48 | 10 oz. |
| 6 | Sodium Phosphate | 2.22 | 8 oz. |

EXAMPLE XXVI

Table III below sets forth typical compositions from which whips may be secured that are stable against collapse under room temperature conditions for prolonged periods and which are stable against collapse through successive freeze-thaw cycles between approximately 0°F. and 70°F.

TABLE III

| Composition No.<br>Dry Ingredients | A | E | F | D |
|---|---|---|---|---|
| Synthetic Dry Milk Solids¹ (grams) | 131 | 255.6 | 150 | 170 |
| Pregelatinized Starch (grams) | 28.4 | 28.4 | 28.4 | 28.4 |
| Calcium Acetate (Monohydrate) (grams) | 1.0 | 1.5 | 1.5 | 1.5 |
| Sodium Caseinate (grams) | — | 10 | 15 | 10 |
| Sodium Phosphate (Monobasic) (grams) | 1.0 | — | 1.0 | 2 |
| Sodium Chloride (grams) | — | — | — | — |
| Cane Sugar (grams) | 20 | 40 | 30 | 20 |
| Cerelose (grams) | 30 | 65 | 50 | 50 |
| Dry Vanilla (grams) | 10 | — | — | — |
| Dry Vanilla (grams) | — | 20 | — | — |

In the case of Composition "A", the ingredients may be mixed with 494 grams of water at 34°F., and thereafter whipped with a conventional beater of the restaurant type for about 4 minutes to secure a set. The resulting overrun will normally be about 300 percent.

The dry ingredients of Composition "E" may be mixed with 494 grams of a 50:50 mixture of ice and water and thereafter whipped for about 4 minutes on a conventional restaurant type beater until the whip sets. The whipped product in such case will be found to have a volume increase of about 350 percent.

A pie filling may be prepared from Composition "F" by mixing the dry ingredients with 494 grams of cherry juice and 113 grams of chopped cherries and thereafter cooled to about 34°F. in a matter of about 2 hours in a conventional home freezer. thereafter, the mixture may be beaten with a conventional restaurant type beater to provide a whipped pie filling having an overrun of about 300 percent.

The dry ingredients of Composition "D" may be mixed with 494 grams of a 50:50 mixture of ice water and beat with a conventional restaurant type beater until the volume increases to about 250 percent overrun. At this point, 400 grams of canned pumpkin may be added to the whipped product and the whipping procedure continued until the whip sets. The resulting product will have an approximate volume increase of about 325 percent and is admirably suited for use as a pie filling in making pumpkin pies.

Substitution of the calcium acetate with other water soluble calcium salts in attempting to prepare the stable, whipped food products of this invention has not proven successful. Nor have stable whips been obtained when the sodium caseinate has been replaced with lithium or potassium caseinate. These observations are illustrated in the following comparative experiments.

EXPERIMENT NO. 1

Each of the following ingredients was weighed out in the amount indicated:

| Ingredients | Amounts (grams) |
|---|---|
| Pregelatinized starch | 33 |
| Hydrogenated Coconut Oil | 95 |
| Emulsifier (mixed mono and diglycerides of fatty acids of 12 to 18 carbon atoms) | 10 |
| Sodium caseinate | 20 |
| Calcium acetate monohydrate | 1.1 |
| Cane sugar (fine) | 57 |

All of the above ingredients except the coconut oil were mixed together and that mixture then added to one pint of water. The coconut oil was then added to that mixture and the mixture was heated to boiling in order to melt the oil and obtain a uniform blend of ingredients. The resultant blend was placed in a 5 quart capacity mixing bowl and the bowl and contents were placed in a freezer until the temperature of the blend had dropped to 29°F. Then, the chilled blend was whipped using the middle speed of a three speed, table model, Hobart electric mixer (Model No. N50, 1,725 r.p.m. top speed, Spec. No. 4749) until the mixture was in the form of a set whip, resembling a conventional cream pie filling. The volume of the whip was then measured by scooping the whip out of the mixing bowl with a one pint measuring cup. The volume of the whip was abour 4 pints, representing about a 300 percent increase over the volume of the mixture before whipping.

One 1-pint sample of the whip was left standing at room temperature in a square, one pint capacity, polyethylene bowl, and a second 1-pint sample was placed in a refrigerator that was maintained at about 45°F. At the end of one hour, the volume and shape of both samples were unchanged, thus establishing the whip as having good room temperature and refrigerator temperature stability.

To ascertain the freeze-thaw stability of the whip, a third 1-pint sample thereof was subjected to the following temperature cycle:

1. Frozen in a freezer to about −10°F.
2. Thawed in a refrigerator to 45°F.
3. Brought to room temperature.

No change in the volume, structural stability, or appearance of the whip was observed after any of the above temperature changes; in particular, the whip retained its ability to hold a peak and it did not bleed.

These results established the whip as having excellent freeze-thaw stability.

EXPERIMENT NO. 2

A whipping mixture was prepared and tested in the same manner as in Experiment No. 1, but using a molar equivalent, 1.3 grams, of calcium chloride dihydrate in place of the calcium acetate monohydrate. The volume of the mixture increased to about 3 pints when whipped, but instantly collapsed when the whipping was ceased, thus establishing the mixture as being incapable of producing a set whip.

EXPERIMENT NO. 3

A whipping mixture was prepared and tested in the same manner as in Experiment No. 2, but using only 0.4 gram of calcium chloride dihydrate. The results observed were the same as in Experiment No. 2, except that this time the volume of the mixture was slightly less increased by the whipping operation.

EXPERIMENT NO. 4
(Example II Repeated)

| | |
|---|---|
| Pregelatinized Starch | 30 gm. |
| Dried Skim Milk Powder | 160 gm. |
| Sodium Caseinate | 15 gm. |
| Calcium Acetate Monohydrate | 2 gm. |
| Cane Sugar, Fine | 65 gm. |
| Water and Ice | 474 gm. |

The dry ingredients were sifted together twice, using a fine mesh tea strainer. They were then added to the ice water and blended at slow speed for 1 minute. The mixture was then whipped at high speed for five minutes. There was an increase in volume of the mixture of about 350 percent. The product obtained was a whip which remained stable, i.e., did not collapse and did not bleed, when subjected to the following freeze-thaw cycle:

From 45°F. to −10°F. to 45°F.
From 45°F. to 70°F. to 45°F.
From 45°F to −10°F. to 45°F. to 70°F. to 45°F.

EXPERIMENT NO. 5

Experiment No. 4 was repeated, but using 2 grams of calcium chloride in place of the calcium acetate monohydrate. The increase in volume was about 200 percent. When left standing at room temperature, the product lost about half of its volume in one hour. When subjected to the temperature changes from 45°F. to −10°F. to 45°F., it lost its shape and began to bleed badly.

EXPERIMENT NO. 6

Experiment No. 5 was repeated, but using the molar amount of calcium chloride equivalent to the molar amount of calcium acetate monohydrate that was used in Experiment No. 4, i.e., 0.114 mole. The results were the same as in Experiment No. 2.

EXPERIMENTS NOS. 7-14

Experiment No. 6 was repeated, but using respectively, calcium lactate, calcium propionate, calcium benzoate, calcium butyrate, calcium isobutyrate, calcium salicylate, calcium valerate, and calcium nitrate, instead of calcium chloride. The results with calcium lactate were substantially the same as in Experiment No. 5. Using calcium propionate, however, only a slight foam was obtained and no set whip. With each of the other calcium salts, a whip was obtained which had about a 200 percent increase in volume but which, when subjected to freezing temperatures, collapsed before becoming frozen.

EXPERIMENTS NOS. 15-20

Experiment No. 4 was repeated, but using, respectively, 5, 10, 15, 20, 25 and 30 grams of lithium caseinate in place of the sodium caseinate. In none of these experiments was a true whipped product obtainable. Using the 5 and 10 gram concentrations, there was substantially no increase in volume of the mixture. Use of the higher concentrations provided a maximum volume increase of no more than 75 percent, and the products obtained had the appearance of a foam that was entrapped within a gel, as distinguished from the appearance of a smooth, stable, set whip.

EXPERIMENTS NOS. 21-26

Experiments Nos. 15-20 were repeated, but using potassium caseinate in place of the lithium caseinate. Substantially the same results were obtained as in Experiments Nos. 15-20.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A composition for use as a base composition in preparing aqueous whipped food products, consisting essentially of a solid particle from admixture of pregelatinized starch, about 3 to 75 percent, by weight of the starch, of calcium acetate, about 3 to 300 percent, by weight of the starch, of sodium caseinate, and about 0.5 part or greater, per part by weight of starch, of a filler selected from the group consisting of fat, casein, and mixtures of fat and casein, with the proviso that if said admixture contains fat, it also contains a minor amount, effective to emulsify the fat, of an edible emulsifier for the fat.

2. The composition of claim 1 wherein the sodium caseinate is present in an amount of about 20 to 300 percent, by weight of the starch, and the filler is present in an amount of about 0.5 to 4 parts, per part by weight of starch.

3. The composition of claim 2 wherein sugar is additionally present in starch dispersing amounts.

4. The composition of claim 3 wherein the filler is fat.

5. The composition of claim 4 wherein the fat is vegetable fat and the emulsifier therefor is a fatty acid ester emulsifier.

6. The composition of claim 5 wherein the fat is saturated, has a melting point of about 50°–140°F., and is present in an amount in the range of about 1.6 to 3 parts, per part by weight of the starch.

7. The composition of claim 6 wherein the fat has a melting point of about 80°–110°F., and the composition contains about 8 to 12 percent of the fatty acid ester emulsifier, based on the weight of the fat.

8. The composition of claim 3 wherein the filler is casein.

9. The composition of claim 8 wherein the casein is supplied to the admixture by skimmed or whole milk solids.

10. The composition of claim 9 wherein the casein is supplied to the admixture by skimmed milk solids.

11. The composition of claim 10 wherein the skimmed milk solids are present in an amount in the range of about 1.4 to 5.3 parts, per part by weight of the starch.

12. The composition of claim 6 wherein sugar is present in a weight ratio of sugar to starch of about 1:1 to 10:1.

13. The composition of claim 11 wherein sugar is present in a weight ratio of sugar to starch of about 1:1 to 10:1.

14. The composition of claim 12 wherein the sugar is sucrose or glucose.

15. The composition of claim 12 especially for use as a base composition in preparing aqueous whipped food products containing alcoholic or acidic components, wherein the weight ratio of the sodium caseinate to calcium acetate (calculated as the monohydrate) is greater than 7.5:1 and up to 60:1.

16. The composition of claim 13 especially for use as a base composition in preparing aqueous, whipped food products containing alcoholic or acidic components, wherein the weight ratio of the sodium caseinate to calcium acetate (calculated as the monohydrate) is greater than 7.5:1 and up to 60:1.

17. The composition of claim 12 especially for use in preparing frozen whipped products, wherein sodium monobasic phosphate is present in plasticizing amounts.

18. The composition of claim 17 wherein the sodium monobasic phosphate is present in an amount between about 0.25 and 0.75 percent, based on the weight of solids in the composition.

19. The composition of claim 13 especially for use in preparing frozen whipped products, wherein sodium monobasic phosphate is present in plasticizing amounts.

20. A method of preparing a stable, aqueous, whipped food product, comprising forming a fluid mixture consisting essentially of water, gelatinized starch, calcium acetate, sodium caseinate, and a filler selected from the group consisting of fat, casein, and mixtures of fat and casein, with the proviso that if said mixture contains fat, it also contains a minor amount, effective to emulsify the fat, of an edible emulsifier for the fat, said calcium acetate being present in the mixture in an amount of about 3 to 75 percent, based on the weight of the starch, said sodium caseinate being present in an amount of about 20 to 300 percent, based on the weight of the starch, said filler being present in an amount of about 0.5 part or greater, per part by weight of the starch, said starch being present in an amount sufficient to provide a set whip, and said mixture having a total solids content sufficient to give a desired whip consistency, and whipping inert gas into the mixture for a period of time sufficient to entrap the gas therein and to permit the resulting whip to thicken and set, said mixture being at a temperature below about 45°F. when said whipping step is initiated.

21. The method of claim 20 wherein sugar is additionally present in the mixture in a starch dispersing amount.

22. The method of claim 4 wherein the starch is present in an amount between about 5 and about 13 percent, based on the weight of water in the mixture; the sodium caseinate is present in an amount of about 30 to 200 percent, by weight of the starch; the calcium acetate is present in an amount of about 3 to 35 percent, by weight of the starch; and the mixture has a total solids content of about 29 to 50 weight percent.

23. The method of claim 22 wherein the filler is fat.

24. The method of claim 23 wherein the fat is vegetable fat, the emulsifier therefor is a fatty acid ester emulsifier, and the gas is air.

25. The method of claim 24 wherein the fat is saturated, has a melting point of about 50°-140°F., and is present in an amount in the range of about 1.6 to 3 parts, per part by weight of the starch.

26. The method of claim 25 wherein the fat has a melting point of about 80°-110°F., and the mixture contains about 8 to 12 percent of the fatty acid ester emulsifier, based on the weight of the fat.

27. The method of claim 26 wherein the sugar is present in a weight ratio of sugar to starch of about 1:1 to 10:1.

28. The method of claim 27 wherein the mixture is at a temperature below about 40°F. when the whipping step is initiated.

29. The method of claim 28 wherein sodium monobasic phosphate is present in the mixture in an amount between about 0.25 and 0.75 percent, based on the weight of solids in the mixture.

30. The method of claim 28 wherein at least a portion of the water component of the mixture is supplied by citrus fruit juice, and the weight ratio of sodium caseinate to calcium acetate (calculated as the monohydrate) is greater than 7.5:1 and up to 60:1.

31. The method of claim 30 wherein the gelatinized starch component of the mixture is obtained by first forming the mixture with raw starch and then heating the raw starch-containing mixture to a temperature sufficient to effect gelatinization of the starch and pasteurization of the citrus fruit juice.

32. The method of claim 20 wherein the filler is casein.

33. The method of claim 32 wherein the casein is supplied to the mixture by skimmed or whole milk solids and the gas is air.

34. The method of claim 33 wherein the casein is supplied to the mixture by skimmed milk solids.

35. The method of claim 34 wherein the skimmed milk solids are present in an amount in the range of about 1.4 to 5.3 parts, per part by weight of the starch.

36. The method of claim 35 wherein sugar is present in the mixture in a weight ratio of sugar to starch of about 1:1 to 10:1.

37. The method of claim 36 wherein the mixture is at a temperature below about 40°F. when the whipping step is initiated.

38. The method of claim 37 wherein sodium monobasic phosphate is present in the mixture in an amount between about 0.25 and 0.75 percent, based on the weight of solids in the mixture.

39. The method of claim 38 wherein at least a portion of the water component of the mixture is supplied by citrus fruit juice, and the weight ratio of sodium caseinate to calcium acetate (calculated as the monohydrate) is greater than 7.5:1 and up to 60:1.

40. The method of claim 39 wherein the gelatinized starch component of the mixture is obtained by first forming the mixture with raw starch and then heating the raw starch-containing mixture to a temperature sufficient to effect gelatinization of the starch and pasteurization of the citrus fruit juice.

41. A milk product having increased resistance to spoilage, said product consisting essentially of fresh, whole, pasteurized, cow's milk having dispersed therein an admixture of pregelatinized starch, about 3 to 75 percent, by weight of the starch, of calcium acetate, and about 3 to 300 percent, by weight of the starch, of sodium caseinate, said admixture being present in an amount sufficient to retard spoilage of the milk.

42. The product of claim 41 wherein the composition contains approximately 1 part by weight of calcium acetate monohydrate, 15 parts by weight of sodium caseinate, and 28.4 parts by weight of pregelatinized starch.

43. A meat product having increased resistance to spoilage, said product consisting essentially of meat having a coating of an admixture of pregelatinized starch, about 3 to 75 percent, by weight of the starch, of calcium acetate, and about 3 to 300 percent, by weight of the starch, of sodium caseinate, said coating being present thereon in an amount sufficient to retard spoilage of the meat.

44. The product of claim 43 wherein the composition contains approximately 1 part by weight of calcium acetate monohydrate, 15 parts by weight of sodium caseinate, and 28.4 parts by weight of pregelatinized starch.

45. A stable, edible, set whip comprising water, gelatinized starch, calcium acetate, sodium caseinate, saturated vegetable fat having a melting point of about 80°–110°F., a minor amount, effective to emulsify the fat, of an edible, fatty acid ester emulsifier for the fat, and sugar, said whip containing, for each 100 parts by weight of the starch therein, about 3 to 35 parts by weight of the calcium acetate and about 30 to 200 parts by weight of the sodium caseinate, said starch being present in an amount between about 5 and about 13 percent, based on the weight of the water, said fat being present in an amount in the range of about 1.6 to 3 parts, per part by weight of the starch, said sugar being present in a weight ratio of sugar to starch of about 1:1 to 10:1, and said mixture having a total solids content of about 29 to 50 weight percent.

46. A stable, edible, set whip comprising water, gelatinized starch, calcium acetate, sodium caseinate, skimmed milk solids, and sugar, said whip containing, for each 100 parts by weight of the starch therein, about 3 to 35 parts by weight of the calcium acetate and about 30 to 200 parts by weight of the sodium caseinate, said starch being present in an amount between about 5 and about 13 percent, based on the weight of the water, said skimmed milk solids being present in an amount in the range of about 1.4 to 5.3 parts, per part by weight of the starch, said sugar being present in a weight ratio of sugar to starch of about 1:1 to 10:1, and said mixture having a total solids content of about 29 to 50 weight percent.

* * * * *

UNITED STATES PATENT OFFICE
CERTIFICATE OF CORRECTION

Patent No. 3,843,805  Dated October 22, 1974

Inventor(s) LOUIS A. POWELL

It is certified that error appears in the above-identified patent and that said Letters Patent are hereby corrected as shown below:

COLUMN 1, line 13, the word "are" should read ---and---.

2, line 40, the word "illustory sensor" should read ---illusory sense---.

3, line 7, the word "are" should appear only once.

6, line 53, "Compositions E" should read ---Composition E---.

, line 53, (at end of line) the word "(Composition" should be deleted.

7, line 19, the hyphen at the end of the line should be deleted.

14, line 3, the word "greated" should read ---greater---.

15, line 13, the word "for" should read ---of---.

21, line 32, the word "It" should read ---In---.

22, line 20, "45 .0" should read ---45.0---, thus lining up the decimal with the other numerals.

23, line 48, the word "thereafter" should read ---Thereafter---.

, line 54, "ice water" should read ---ice and water---.

24, line 48, the word "abour" should read ---about---.

26, line 38, the word "from" should read ---form---.

28, line 4, the numeral "4" should read ---21---.

Signed and sealed this 28th day of January 1975.

(SEAL)
Attest:

McCOY M. GIBSON JR.
Attesting Officer

C. MARSHALL DANN
Commissioner of Patents